United States Patent [19]

Chumley

[11] 4,436,040

[45] Mar. 13, 1984

[54] LANDSCAPING AND SEEDING APPARATUS

[76] Inventor: William M. Chumley, Rte. 6, Box 600, Greer, S.C. 29651

[21] Appl. No.: 409,968

[22] Filed: Aug. 20, 1982

Related U.S. Application Data

[63] Continuation of Ser. No. 144,427, Apr. 28, 1980.

[51] Int. Cl.³ .............................................. A01C 7/08
[52] U.S. Cl. ..................................... 111/10; 37/117.5; 172/136; 172/197; 172/250; 172/684.5
[58] Field of Search .................... 111/1, 6–12, 111/67, 79, 81; 172/136, 177–179, 197, 199, 200, 250, 251, 253, 254, 192, 777, 198, 245, 782, 799.5, 445.1, 684.5, 247; 37/117.5, 118

[56] References Cited

U.S. PATENT DOCUMENTS

| | | | |
|---|---|---|---|
| 634,578 | 10/1899 | Kaucher | 37/117.5 |
| 1,856,148 | 5/1932 | Ball | 172/136 |
| 2,433,019 | 12/1947 | Arps | 37/117.5 |
| 2,545,739 | 3/1951 | Martin | 37/117.5 |
| 2,698,492 | 1/1955 | Justice | 172/136 |
| 2,774,155 | 12/1956 | Hipp | 172/197 |
| 2,787,491 | 4/1957 | Roberts | 172/254 |
| 2,839,851 | 6/1958 | Geiszler | 172/197 |
| 2,840,933 | 7/1958 | Brem | 37/117.5 |
| 2,874,489 | 2/1959 | Orjala | 172/199 |
| 2,965,053 | 12/1960 | Gruber | 111/10 |
| 3,065,556 | 11/1962 | Kampert | 37/117.5 |
| 3,069,791 | 12/1962 | French | 172/197 |
| 3,213,554 | 10/1965 | Dalton | 172/136 |
| 3,352,261 | 11/1967 | Bonnell | 111/8 |
| 3,448,814 | 6/1969 | Bentley et al. | 172/197 |
| 3,470,964 | 10/1969 | West et al. | 172/197 |
| 3,709,303 | 1/1973 | Richards | 172/197 |
| 3,826,209 | 7/1974 | Jackson | 111/10 |
| 3,834,465 | 9/1974 | Collins | 172/197 |
| 3,860,131 | 1/1975 | Borowski | 37/118 |
| 3,891,035 | 6/1975 | Miller et al. | 172/197 |

FOREIGN PATENT DOCUMENTS 1328796 9/1973 United Kingdom ............... 172/197

Primary Examiner—James R. Feyrer
Attorney, Agent, or Firm—Bailey & Hardaway

[57] ABSTRACT

The present invention is directed to a multi-purpose lawn landscaping and seeding device for attachment to and operation from a prime mover, such as a tractor, and, more particularly, to such a multi-purpose device in which all functions normally carried out by multiple pieces of equipment in preparing, grading, seeding and fertilizing a new lawn, or in renovating an existing lawn, can be performed by a single piece of equipment transported by and operated from a tractor.

22 Claims, 5 Drawing Figures

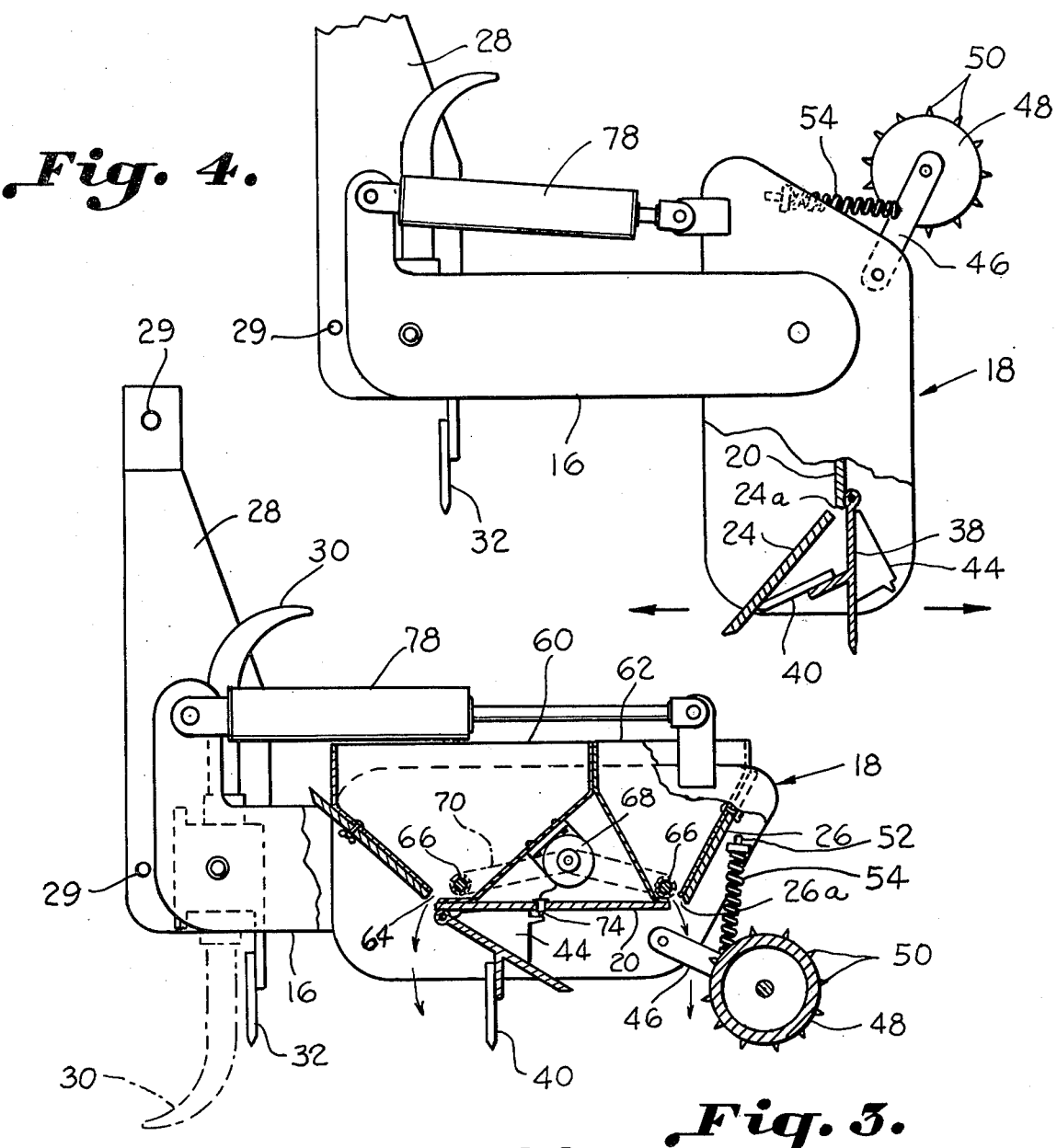
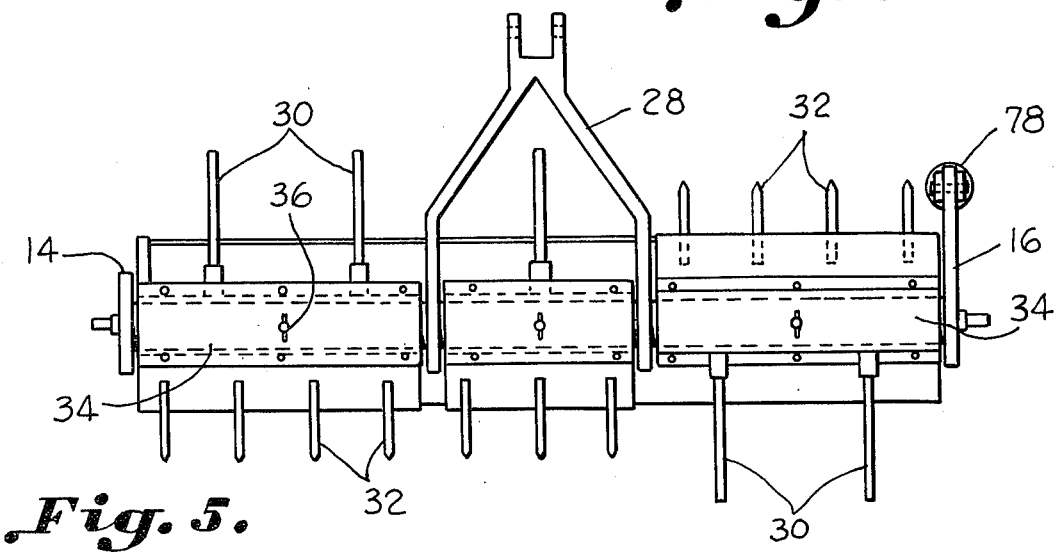

LANDSCAPING AND SEEDING APPARATUS

This application is a continuation of application Ser. No. 144,427, filed Apr. 28, 1980.

BACKGROUND OF THE INVENTION

In landscaping and establishing a new lawn in areas, such as around newly constructed residential or commercial buildings, it is a normal practice, after initial bulldozer clearing of the trees on the land, to plow, level, scarify, rake and pulverize the soil, and to remove trash, rocks and other debris from the area before seeding. Thereafter, the landscaped ground is fertilized, seeded and smoothed. In the past, it has been necessary to use multiple pieces of equipment, or attachments, which are either self-propelled or must be connected to and disconnected from a prime mover, such as a tractor, in performing at least certain of the sequential operations mentioned above. For example, after initial bulldozer operations, it is the practice to backfill relatively large depressions left by the bulldozer where trees have been removed, to plow the ground to a desired depth to break up the soil, to level, rake and scarify the soil, and to pulverize large clods of soil to maintain a uniform texture to the soil. Prior to seeding, trash and debris must be collected and removed from the area to be seeded, generally necessitating the use of a front end loader to remove the same.

Attempts have been made to provide apparatus which perform combined functions similar to certain of the abovementioned landscaping and seeding operations. Very early U.S. Pat. No. 206,120 discloses a road grader attachment having earth breaking, leveling and packing components, while U.S. Pat. No. 629,313 discloses an attachment having combined harrow, pulverizer and crusher components. U.S. Pat. No. 2,839,851 discloses a scarifier and scraper with backfill attachment, and U.S. Pat. No. 3,448,814 discloses a grader bucket construction having plow, scarifier, scraper and roller crusher, with backfill capabilities. U.S. Pat. No. 3,083,652 discloses an earth conditioning and seeding trailer for attachment to a prime mover, while more recent U.S. Pat. No. 4,088,083 discloses a tillage apparatus having detachable plow, scarifier, seeder, and roller attachments. U.S. Pat. No. 3,083,652 discloses an earth conditioning and seeding trailer, while U.S. Pat. No. 3,822,655 discloses a self-propelled lawn conditioning vehicle for smoothing, fertilizing and seeding a lawn. U.S. Pat. No. 3,998,276 discloses a scarifier or plow apparatus capable of deep soil penetration and smoothing operation, and employing a scoop for breaking up the soil prior to compaction.

Although the above-mentioned apparatus provide combinations of components to perform multiple operations in a land grading, or in a seeding operation, it is not believed that any of the apparatus disclosed can perform all of the operations necessary for landscaping, fertilizing and seeding of a lawn area, as with the apparatus of the present invention. In addition, many of the apparatus disclosed in the above-mentioned patents are quite bulky and difficult to handle, obviously limiting their use to relatively large open areas, and not suitable for narrow, close areas around buildings and between concrete driveways, trees, and the like.

It is therefore an object of the present invention to provide a multi-purpose lawn landscaping and seeding device for attachment to and operation from a prime mover, such as a garden tractor, which is of compact, relatively lightweight construction, and which can be utilized to perform, with a single piece of equipment, all of the necessary functions for normal landscaping and seeding of a lawn.

It is another object to provide an apparatus of the type described which may be easily transported to a landscaping site and readily manipulated in confined or small areas of the site to perform all the necessary operations required.

It is a more specific object to provide a multi-purpose lawn landscaping and seeding device which permits plowing, scarifying, raking, fertilizing, seeding and pulverizing and which further may be utilized for scraping, leveling and backfilling of the ground, as well as for removal of trash, rocks and other debris from the site.

SUMMARY OF THE INVENTION

It has been found that a multi-purpose lawn landscaping and seeding device including a support frame and means supporting the frame for transport may be provided with an elongated pan having a bottom, wall, opposed side walls, and upstanding front and rear walls, with the front wall defining a ground scraper blade. Means are provided for mounting the pan on the frame for pivotal movement about its longitudinal axis between a first position wherein the bottom wall of the pan is generally horizontally disposed, and a second position wherein the bottom wall is generally upright with the front wall scraper blade extending downwardly and forwardly for engagement with the ground. Ground scarifying means include a row of scarifier tines pivotally attached to and spaced along the length of a forward undersurface portion of the pan with the tines extending downwardly from the pan to engage the ground when the pan is in the first position. Means is provided for moving the pan between the second position wherein the scraper blade is in engagement with the ground to remove soil therefrom, and the first position wherein the pan is generally horizontally disposed to transport removed soil therein.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a perspective view of a multi-purpose lawn landscaping and seeding device of the present invention which may be attached to and operated by a small tractor and the like;

FIG. 3 is a side elevation of the device with parts in section and parts broken away;

FIG. 4 is a side elevation of the apparatus with parts in alternate position; and FIG. 5 is a front elevation of the assembly looking toward a hitch with rear tines and roller omitted for clarity.

DESCRIPTION OF A PREFERRED EMBODIMENT

Figure 1:
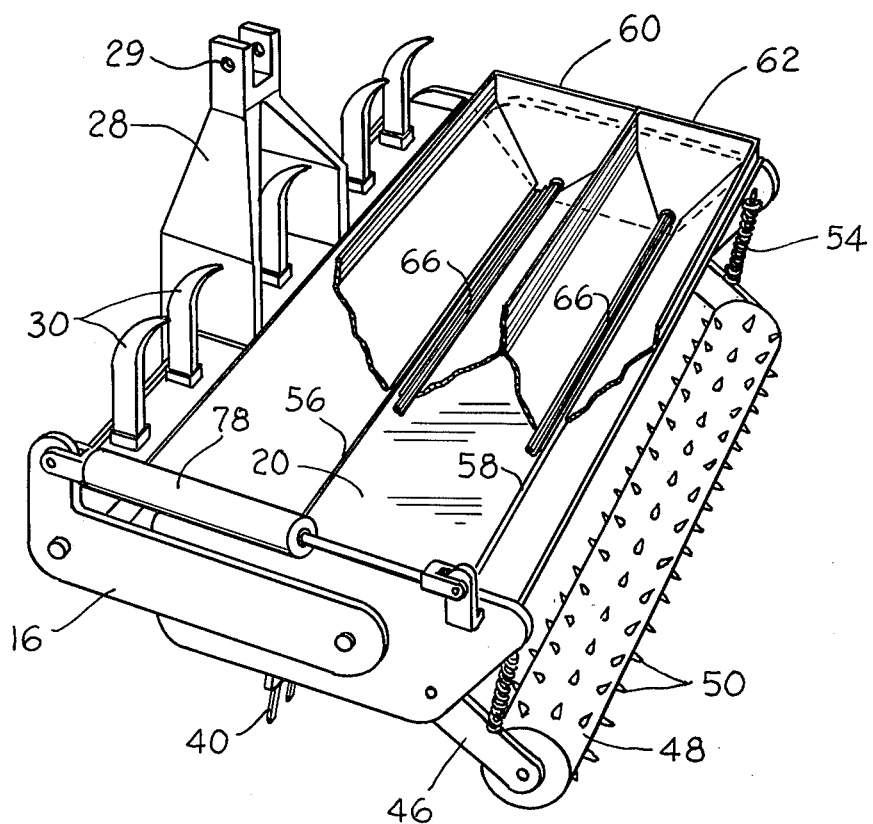

Referrring more particularly to the drawings, the landscaping and seeding device of the present invention comprises a main frame broadly designated at 10 having a generally horizontal pipe support member 12 and a pair of horizontal support arms 14, 16 extending rearwardly thereof from respective end portions of the support member 12. Mounted between the support arms 14, 16 for pivotal movement about its longitudinal axis is an elongate pan broadly designated at 18, having a bottom wall 20, opposed side walls 22, and upwardly flaring front and rear walls, 24, 26, respectively. The front wall 24 extends a distance beyond side walls 22 and serves as a ground scraper blade, as will be explained.

The support frame 10 is removably attached to a three-point hitch of a prime mover, such as a tractor (not shown), by means of a yoke member 28 which is fixedly secured to a midportion of elongate support member 12 and extends generally upwardly therefrom. Yoke member 28 is provided with three attachment points 29 for receipt of respective arms of the three-point hitch of the prime mover, which arms are secured to the yoke by means of pins, bolts or the like. Thus, the landscaping and seeding device may be raised and lowered out of and into contact with the ground for respective transporting and ground-engaging operative use at the work site.

Figure 2:
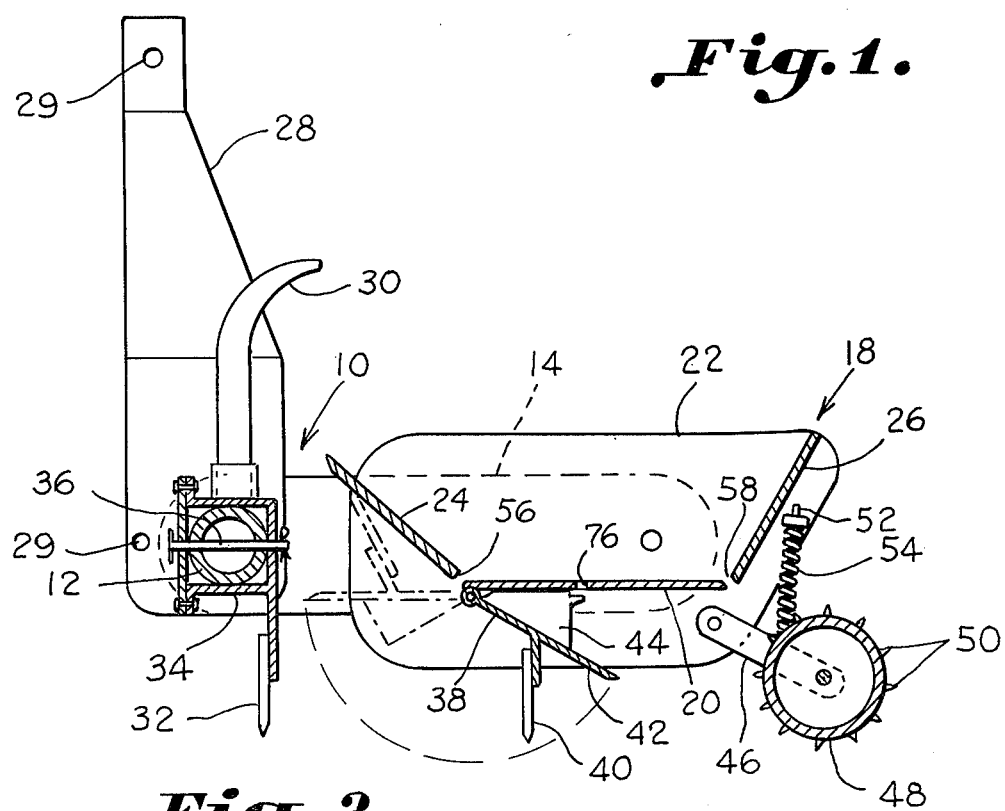
FIG. 2 is a longitudinal sectional elevation of the apparatus of FIG. 1.

Attached to and extending along the length of frame support member 12 is a row of spaced plow tines 30 and a row of ground scarifying and raking tines 32. As best seen in FIGS. 1 and 2, the plow tines and scarifying tines are supportably disposed in oppositely extending directions on common support means, such as a plurality of rectangular channel members 34 which are rotatably received about support member 12 and are adjustably secured against rotation in a desired position by locking pins 36 which mate with aligned holes in the channel members and pipe support member 12. Thus, one or more of all of the channel members 34 may be adjustably rotated and positioned about support member 12 to dispose the plow tines 30 or the scarifying tines 32 downwardly from the support member for engagement with the ground.

As best seen in FIGS. 2 and 3, pivotally attached by a pivot arm 38 to a forward undersurface portion of the pan 18 is a second row of scarifying tines 40 which extend in spaced relation along the length of the pan between support arms 14, 16 and are positioned in staggered relation with respect to individual of the scarifying tines 32 in the row of tines on support pipe 12. Integrally attached to pivot arms 38 supporting the row of tines 40 and extending rearwardly at an acute angle from the tines is an elongate soil backfill blade 42. In the position of the pan as seen in FIG. 1, the scarifying tines 40 are pivotally movable about a generally horizontal axis and extend in a downward direction to engage the ground. Rearward pivotal movement of the tines 40 during their use is limited by stop members or triangular plates 44, attached to the upper rear face of the backfill blade. As can be seen, the stop members 44 engage the undersurface or bottom wall 20 of pan 18 and maintain the scarifying tines in downward, ground-engaging position when the device is moved forwardly over the ground by a prime mover.

Pivotally attached to a rear undersurface of the pan 18 by means of lever arms 46 attached to side walls 22 of the pan are pulverizing means, shown as a rotatable roller 48 having a plurality of pins or spikes 50 extending from the peripheral surface thereof. During forward movement of the pan across the ground in its position as shown in FIG. 1, the pulverizing roller 48 is yieldingly biased in a downward direction to engage the ground by means of a connecting rod 52 and compression spring 54 which connects each lever arm 46 to the side wall of the pan. In this manner, pulverizing roller 48 is free to engage the ground and break up lumps or clods of soil and smooth the soil, while being able to move upwardly against the force of the compression spring when the pan is pulled over uneven portions of the ground by the prime mover.

As best seen in FIGS. 1 and 2, the bottom portion of the pan is provided with a pair of elongate slots 56, 58 which extend across the width of the pan in forwardly and rearwardly spaced relation. Removably receivable in the pan are a pair of fluent material containing hoppers 60, 62 which, respectively, hold fertilizer and seed for seeding the lawn after the ground has been plowed, cleaned and leveled for seeding. Each of the hoppers 60, 62 is provided with an elongate discharge chute 64 (FIG. 3) which is matingly received in respective elongate slots 56, 58 in the bottom of the pan. Fluent material conveying means, such as an elongate fluted roll 66 is provided adjacent each discharge chute to direct fertilizer and seed from the hoppers through the chutes and onto the ground. Each of the fluted rollers 66 is rotatably driven by means of a motor 68 which is attached to the frame of hopper 60 and is drivingly connected to each of the rollers 66 by means of a belt drive 70.

The motor 68 is connected by electrical wiring (not shown) to the electrical power output of a prime mover, and is provided with an electrical switch 74 which is also mounted on the frame of hopper 60 and extends through a small hole 76 (FIG. 2) in the bottom of pan 18. Switch 74 is engaged by stop member 44 on backfill blade 42 when the stop member is brought into engagement with the bottom of the pan by contact of scarifying tines 40 with the ground and forward movement of the pan across the ground. When switch 74 is engaged by the stop member, electrical power is supplied to the motor from the prime mover to rotate the fluent material conveying rollers 66 in the hoppers and distribute the fertilizer and seed onto the ground through the discharge chutes. In like manner, when the seeding device is lifted by the three-point hitch of the prime mover, scarifying tines 40 disengage the ground and the tines and backfill blade pivot downwardly by gravity to disengage the switch and stop motor 68. In this manner, distribution of fertilizer and seed can be automatically discontinued by the tractor operator when seeding and fertilizing is not desired, such as in turning or transporting the device across paved areas of the work site.

As best seen in FIG. 2, the pan 18 also may be readily employed for scraping, backfilling and leveling of the work site, as well as to transport trash and other debris from the site in the pan. The pan 18 is attached to the support arm 14 of the frame by motor means, such as a hydraulic piston 78, which is connected to the hydraulic system of the prime mover by hydraulic lines (not shown) to provide power for rotating the pan from a generally horizontal position between the support arms, as shown in FIG. 1, to a generally vertically disposed position as shown in FIG. 4. In vertical disposition, the front wall 24 of the pan engages the ground and serves as a scraping blade to remove soil and provide a leveling action when the pan is moved forwardly by the prime mover. In vertical position, the pan is also employed to accumulate soil, rocks, and trash in the pan, and pivotal movement of the pan to horizontal position by the hydraulic motor enables the collected material to be transported in the pan to a desired discharge point outside the area being landscaped.

For backfilling, with the pan in vertically disposed position, the pan may be moved in rearward direction to utilize the backfill blade to smooth and fill in areas, such as around trees or close to adjacent buildings. As can be seen in FIG. 4, when the pan is vertically disposed and moved in rearward direction to utilize the backfill blade to smooth and fill in areas, such as around trees or close to adjacent buildings. As can be seen in FIG. 4, when the pan is vertically disposed and moved in rearward direction by the prime mover, the backfill blade and row of scarifying tines attached thereto pivot forwardly of the pan until the tines 40 engages the undersurface of the front wall 24 of the pan, thus limiting further pivotal movement of the backfill blade and retaining the blade in a downward, ground-engaging position for backfilling and leveling of the soil.

The capabilities of the multi-purpose lawn landscaping and seeding device of the present invention to provide all functions desired in preparing a lawn may be briefly described as follows. After initial clearing of the land by other heavy equipment, the pan 18 is disposed in horizontal position on the frame and plow tines 30 are rotated to a downward, ground-engaging position to break up the surface of the ground to a desired depth. The following row of scarifying tines 40 on the undersurface of pan 18 assist in further breaking up and pulverizing the plowed soil, as well as in raking larger debris, such as roots, limbs and rocks. The pulverizing roller 48 breaks up remaining clods of soil and provides a leveling function to the plowed surface of the ground. After initial soil preparation, or when desired, the pan 18 may be rotated to a generally vertical position and the front scraper blade utilized to provide further leveling and collection of accumulated debris. Any backfilling that may be desired is also accomplished with the pan in vertical position.

After initial ground preparation, the plow tines may be rotated to an upward position to bring the row of scarifying tines on the support bar of the frame into engagement with the ground. The device may then be employed with the two rows of scarifying tines and pulverizing roller to further clean and level the ground, as desired. When it is desired to scarify or break up soil in narrow or confined areas of the work site, only one or more sections of scarifying tines or plow blades may be employed on the front support bar of the frame, with the pan pivoted to an intermediate position to disengage the scarifying blades and roller from the ground.

For fertilizing and seeding operation, the pan is pivoted to horizontal position as shown in FIG. 1, and the fertilizer and seed hoppers are placed in the body of the pan with their discharge chutes matingly received in the elongate slots. As seen in FIG. 2, the discharge chute of the fertilizer hopper is located between the two rows 32, 40 of scarifying tines and just forward of the second row 40 of tines. The discharge chute of the seed hopper is located between the row of scarifying tines 40 and the pulverizing and smoothing roller 48. In this disposition, as the pan is moved forwardly across the ground by the prime mover, the first row of scarifying tines 32 open the soil to receive fertilizer, while the second row of scarifying tines 40 serve to distribute the fertilizer into the soil to a desired depth. Thereafter, seed is distributed by hopper onto the upper surface of the soil and pressed into the soil by the roller. In this manner, the fertilizer and seed can be distributed in optimum positions for future germination and growth of the lawn.

From the foregoing description of a preferred embodiment of the invention, it can be seen that the multi-purpose lawn landscaping and seeding device may be employed after initial clearing of a work site, to landscape, fertilize and seed a lawn, without the necessity of additional equipment or attachments to be transported to the work site.

While a preferred embodiment of the invention has been described using specific terms, such description is for illustrative purposes only, and it is to be understood that changes and variations may be made without departing from the spirit or scope of the following claims.

What is claimed is:

1. A multi-purpose lawn landscaping device for use on a tractor hitch capable of raising and lowering the device, said landscaping device comprising:
   (a) a support frame;
   (b) means securing said frame to said tractor hitch adjacent one end of said frame;
   (c) an elongate transversely disposed pan having a ground scraper blade adjacent a front portion of said pan facing toward said tractor hitch;
   (d) means mounting said pan on said frame adjacent the other end of said frame for pivotal movement about a longitudinal axis of said pan between a first position wherein said pan is generally horizontally disposed, and a second position wherein said pan is generally upright with said scraper blade extending downwardly for engagement with the ground;
   (e) a fluid motor having pivotal connection on said support frame on one end thereof and on said pan on the other end thereof and on said pan on the other end for moving said pan between said second position wherein said scraper blade is in engagement with the ground to remove soil therefrom, and said first position wherein said pan is generally horizontally disposed to transport removed soil therein; and
   (f) backfill means comprising an elongate blade extending along the length of the pan and pivotally attached to a forward undersurface portion thereof for movement between a rearwardly extending inoperative position when said pan is in said first position, and a downwardly extending operative position for engagement with the ground when said pan is in said second position and said pan is moved rearwardly across the ground.

2. The structure set forth in claim 1 including plow means carried by said frame.

3. The structure set forth in claim 1 including means positioning and feeding seeds in said pan.

4. Apparatus as defined in claim 1 wherein said means for moving said pan comprises fluid actuated motor means interconnecting said pan and said support frame from moving said pan carried by said frame between said first and second positions.

5. Apparatus as defined in claim 1 including soil pulverizing means comprising an elongate rotatable roller carried adjacent said pan in spaced relation from a rear undersurface portion of the pan to extend along the length thereof and engage the ground at a position rearwardly of said scarifying means when the pan is in said first position.

6. Apparatus as defined in claim 5 wherein said soil pulverizing means includes means operatively attached to said roller and yielding biasing said roller in a downward direction to engage the ground when said pan is in said first position.

7. Apparatus as defined in claim 6 wherein said soil pulverizing means includes a plurality of pins extending outwardly from the surface of said roller to engage the ground when said pan is in said first position.

8. Apparatus as defined in claim 5 wherein said pan includes a first and second elongate discharge slot extending along the length of the pan in a bottom portion thereof, said first and second discharge slots being respectively spaced in forward and rearward portions of the pan; first and second hopper means removably receivable in said pan, each of said hopper means including an elongate fluent material discharge chute matingly receivable in respective of said pan discharge slots, elongate fluent material conveying means rotatably mounted in each of said hoppers adjacent the respective discharge chutes thereof for directing fluent material therethrough and onto the ground beneath said pan; said first pan discharge slot and hopper means discharge chute matingly received therein being positioned forwardly of said ground scarifying means, and said second pan discharge slot and hopper means discharge chute matingly received therein being positioned rearwardly of said scarifying means and said pulverizing means when said pan is in said first position to dispense fertilizer onto the ground in front of said scarifying tines and seed onto the ground behind said scarifying means.

9. Apparatus as defined in claim 8 wherein said scarifying tines and said backfill blade are operatively attached to the undersurface of said pan for simultaneous pivotal movement about a horizontal axis relative to said pan in response to pivotal movement of said pan between said first and second positions.

10. Apparatus as defined in claim 9 wherein said scarifying tines and said backfill blade are integrally attached and disposed in angular relation to each other for simultaneous pivotal movement relative to said pan, and said scarifying means includes stop means mounted on said backfill blade for engaging an undersurface portion of said pan to limit rearward pivotal movement of said scarifying tines during their contact with the ground when said pan is in said first position.

11. Apparatus as defined in claim 10 wherein said scarifying tines are positioned to engage undersurface portions of said pan to limit pivotal movement of said backfill blade during rearward movement of the pan across the ground when the pan is in said second position and the backfill blade is in engagement with the ground.

12. A multi-purpose lawn landscaping device comprising:
a support frame;
an elongate pan carried by said frame including a first and second elongate discharge slot extending along the length of the pan in a bottom portion thereof, said first and second discharge slots being respectively spaced in forward and rearward portions of the pan; first and second hopper means removably receivable in said pan, each of said hopper means including an elongate fluent material discharge chute matingly receivable in respective of said pan discharge slots, elongate fluent material conveying means rotatably mounted in each of said hoppers adjacent the respective discharge chutes thereof for directing fluent material therethrough and onto the ground beneath said pan; ground scarifying means carried along the length of a forward undersurface portion of said pan; said first pan discharge slot and hopper means discharge chute matingly received therein being positioned forwardly of said ground scarifying means, and said second pan discharge slot and hopper means discharge chute matingly received therein being positioned rearwardly of said scarifying means when said pan is in said first position to dispense fertilizer onto the ground in front of said scarifying tines and seed onto the ground behind said scarifying means.

13. Apparatus as defined in claim 12 including motor means supportably mounted on one of said hopper means, and means drivingly connecting said motor means to said elongate fluent material conveying means in each of said hopper means to rotate the same.

14. Apparatus as defined in claim 13 including switch means mounted on said hopper means and electrically connected to said motor means, an opening in the bottom wall of said pan, and said switch means extending into and through said opening when said hopper means are supportedly received in said pan.

15. Apparatus as defined in claim 12 wherein support frame includes an elongate generally horizontal support member, and a pair of support arms each fixedly attached to a respective end portion of said elongate support member and extending rearwardly thereof; and wherein said means mounting said pan on said frame for pivotal movement comprises means supportably positioning said pan between said support arms for pivotal movement about its longitudinal axis between said first and second positions of the pan.

16. Apparatus as defined in claim 15 including plow means comprising a row of plow tines adjustably mounted on said elongate support member and extending in spaced relation along the length thereof for movement between an inoperative position and an operative position wherein said plow tines extend downwardly from said support member to engage the ground forwardly of said scarifying means to break up the soil.

17. Apparatus as defined in claim 18 including second scarifying means comprising a row of scarifying tines adjustably attached to and extending in spaced relation along the length of said support member, said second scarifying means tines being movable between an inoperative position and an operative position whereby said tines extend downwardly from said support member to engage the ground forwardly of the tines of said scarifying means attached to the undersurface of said pan.

18. Apparatus as defined in claim 17 wherein said plow means and second scarifying means include common adjustable support means mounting said row of plow tines and said row of scarifying tines in oppositely extending directions therefrom, said common support means surrounding said horizontal support member and rotatably positionable thereabout to alternately locate said plow tines or said scarifying tines in downwardly extending direction from said horizontal support member to engage the ground.

19. Apparatus as defined in claim 18 wherein said common adjustable support means comprise a plurality of support sections spaced along the length of said horizontal support member whereby selected groups of tines in said rows of tines may be located in downwardly extending direction.

20. Apparatus as defined in claim 19 wherein said tines in said row of tines of said second scarifying means are located in staggered relation along the length of said horizontal support member with respect to the spaced scarifying tines in the row of tines pivotally attached to said pan.

21. Apparatus as defined in claim 15 including means on said support frame for securing the frame to the rear hitch of a prime mover.

22. Apparatus as defined in claim 21 wherein said frame-securing means includes yoke means extending upwardly from said horizontal support member for engagement by a three-point hitch of a prime mover whereby said landscaping and seeding device may be lifted from contact with the ground by a prime mover.

* * * * *